US007743115B2

(12) United States Patent
Riordan

(10) Patent No.: US 7,743,115 B2
(45) Date of Patent: Jun. 22, 2010

(54) SOFTWARE CONTENT DOWNLOADING METHODS IN RADIO COMMUNICATION NETWORKS

(75) Inventor: Kenneth Riordan, Spring Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 1063 days.

(21) Appl. No.: 10/083,876

(22) Filed: Feb. 27, 2002

(65) Prior Publication Data

US 2003/0163551 A1    Aug. 28, 2003

(51) Int. Cl.
*G06F 15/16*    (2006.01)
(52) U.S. Cl. .................. 709/219; 709/226; 709/232; 709/240; 717/178
(58) Field of Classification Search .................. 709/203, 709/217–219, 224, 231–232, 225, 226, 240; 370/247, 252, 395.4; 455/419; 717/11, 177, 717/178
See application file for complete search history.

(56) References Cited

U.S. PATENT DOCUMENTS

| | | | | | |
|---|---|---|---|---|---|
| 4,694,453 | A | * | 9/1987 | Kobayashi et al. | 370/249 |
| 5,541,919 | A | * | 7/1996 | Yong et al. | 370/416 |
| 5,850,444 | A | * | 12/1998 | Rune | 705/79 |
| 5,951,639 | A | | 9/1999 | MacInnis | |
| 5,956,368 | A | * | 9/1999 | Jamal et al. | 375/146 |
| 5,978,855 | A | * | 11/1999 | Metz et al. | 709/249 |
| 5,982,778 | A | * | 11/1999 | Mangin et al. | 370/445 |
| 6,044,265 | A | | 3/2000 | Roach, Jr. | |
| 6,052,600 | A | | 4/2000 | Fette et al. | |
| 6,081,692 | A | * | 6/2000 | Hayato | 455/31.2 |
| 6,219,341 | B1 | * | 4/2001 | Varanasi | 370/252 |
| 6,385,174 | B1 | * | 5/2002 | Li | 370/252 |
| 6,671,509 | B1 | * | 12/2003 | Tanaka et al. | 455/419 |
| 6,744,738 | B1 | * | 6/2004 | Park et al. | 370/252 |
| 6,813,270 | B1 | * | 11/2004 | Oz et al. | 370/394 |
| 6,850,915 | B1 | * | 2/2005 | Wiehler | 705/57 |
| 6,889,257 | B1 | * | 5/2005 | Patel | 709/232 |
| 6,912,256 | B1 | * | 6/2005 | Noblet | 375/260 |
| 6,965,913 | B2 | * | 11/2005 | Levitan | 709/203 |
| 2001/0040889 | A1 | * | 11/2001 | Matsuzaki et al. | 370/389 |
| 2002/0018569 | A1 | * | 2/2002 | Panjwani et al. | 380/247 |
| 2002/0032756 | A1 | * | 3/2002 | Toda | 709/219 |

(Continued)

FOREIGN PATENT DOCUMENTS

EP    0635965 B1    7/1994

(Continued)

OTHER PUBLICATIONS

Rummler et al., "Performance of Common and Dedicated Traffic Channels for Pont-to-Multipoint Transmissions in W-CDMA", http://www.ctr.kcl.ac.uk/publications/papers/RobertW-CDMAPoint-to-Multipoint.pdf.*

*Primary Examiner*—Oanh Duong
(74) *Attorney, Agent, or Firm*—Roland K. Bowler, II

(57) ABSTRACT

Radio communication network software downloading methods wherein terminal unique information pertaining to the downloading transaction is communicated on corresponding dedicated communication channels, for example, download initiation (300), capability exchange (320), digital signature (332) and activation and billing (360) communications, among others. Software content, or data, is transmitted (334) from the network to the plurality of terminals on a shared communication channel. In some applications, the software content includes multiple files multiplexed on the shared communication channel, wherein the content may be adjusted dynamically to optimize spectral efficiency.

9 Claims, 3 Drawing Sheets

U.S. PATENT DOCUMENTS

| | | | |
|---|---|---|---|
| 2002/0099842 A1 * | 7/2002 | Jennings et al. | 709/231 |
| 2002/0115467 A1 * | 8/2002 | Hamabe | 455/522 |
| 2003/0043786 A1 * | 3/2003 | Kall et al. | 370/352 |
| 2003/0105845 A1 * | 6/2003 | Leermakers | 709/221 |
| 2003/0110286 A1 * | 6/2003 | Antal et al. | 709/236 |

FOREIGN PATENT DOCUMENTS

| | | |
|---|---|---|
| EP | 0 635 965 A1 | 1/1995 |
| EP | 0905991 A2 | 3/1999 |
| EP | 1049346 A2 | 4/2000 |
| EP | 1335289 A1 * | 8/2003 |
| JP | 2001-086192 * | 3/2001 |
| JP | 2001061186 A * | 3/2001 |
| WO | WO 00/74412 A1 * | 5/2000 |
| WO | 0036502 A1 | 6/2000 |
| WO | 0117214 A1 | 3/2001 |

* cited by examiner

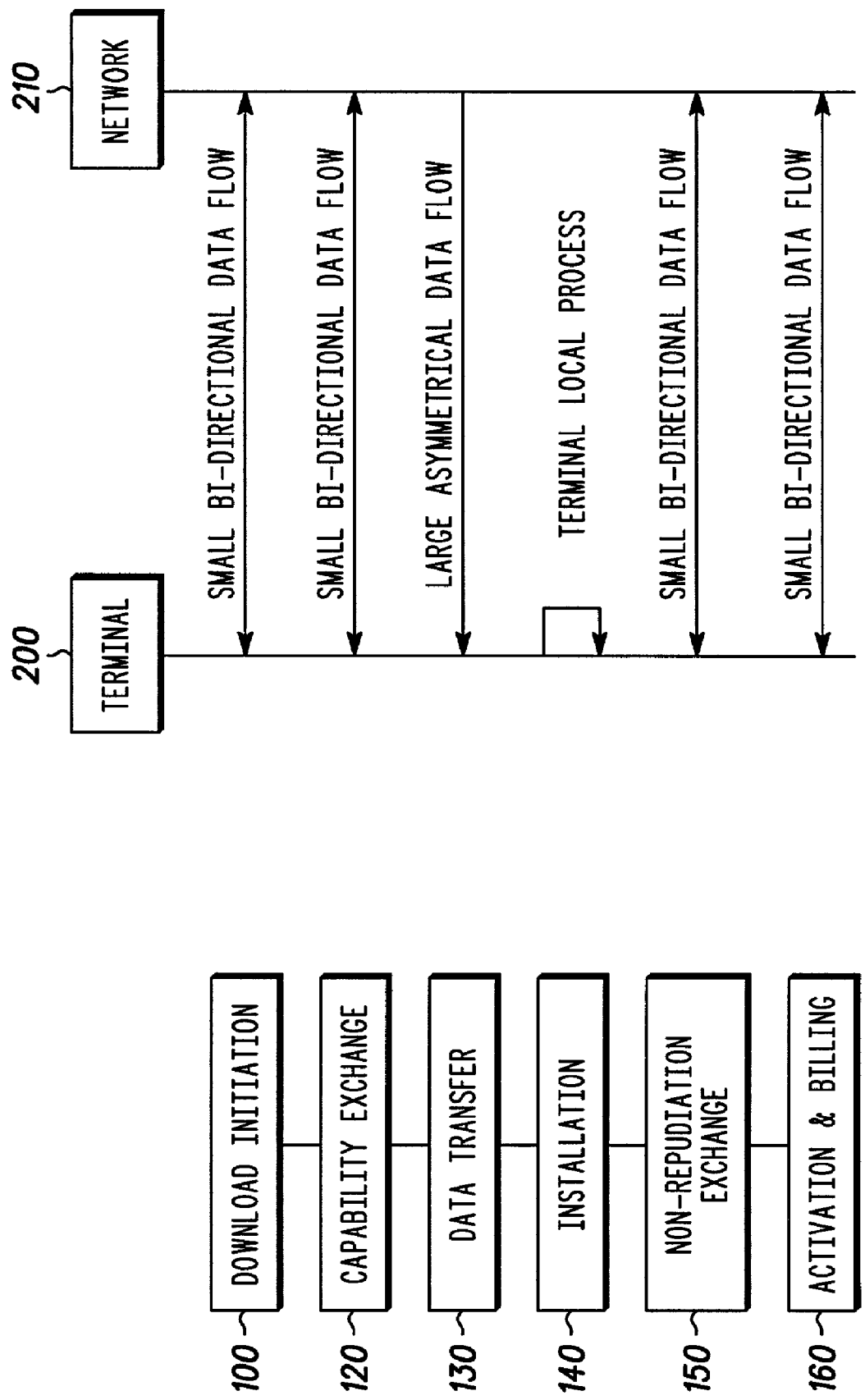

SOFTWARE CONTENT DOWNLOADING METHODS IN RADIO COMMUNICATION NETWORKS

FIELD OF THE DISCLOSURE

The present disclosure relates generally to communications between radio access networks and mobile terminals therein and, more particularly, to downloading software to multiple terminals in wireless communication networks, for example, in cellular communication networks.

BACKGROUND

The emergence of many new wireless technologies, including Wireless Application Protocol (WAP), Java 2 micro-edition programs (J2ME), mobile execution environment (MexE) software, Software Definable Radio (SDR), Terminal Management, among many others, requires over-the-air downloading of terminal software to multiple terminals in wireless communication networks. It will soon be desirable to download software files as large as several Mbytes, and the trend is toward the transfer of even larger files.

The over-the-air downloading of substantial software content in wireless communication networks, however, will likely impose significant burdens on the radio frequency spectrum resources allocated to network operators. In the future, as the code size of terminal software increases, network operators may be compelled to compensate users for software download air-time, for example with free air-time minutes, which is an undesirable cost overhead for the network operators.

The various aspects, features and advantages of the present disclosure will become more fully apparent to those having ordinary skill in the art upon careful consideration of the following Detailed Description with the accompanying drawings, which are described below.

BRIEF DESCRIPTION OF THE DRAWINGS

FIG. 1 is an exemplary schematic of a basic software download process flow diagram.

FIG. 2 is an exemplary schematic of a wireless communication link block diagram corresponding to the basic software download process flow diagram of FIG. 1.

DETAILED DESCRIPTION

Figure 4:
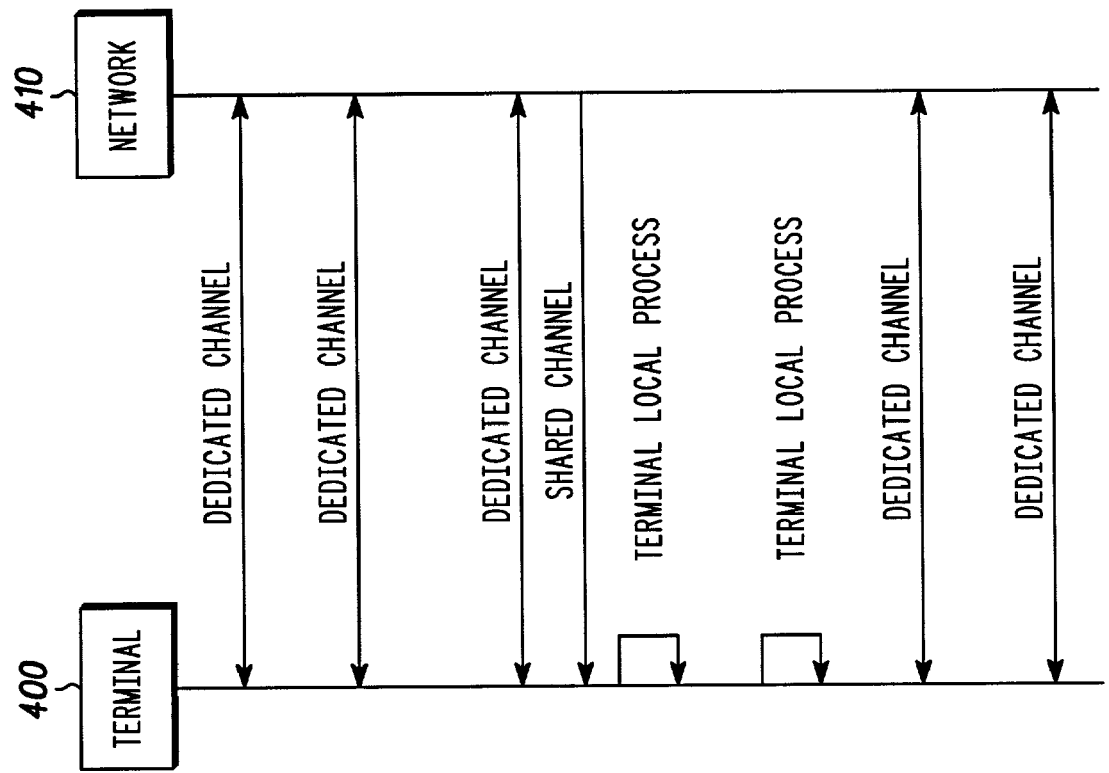
FIG. 4 is an exemplary schematic of a wireless communication link block diagram corresponding to the more particular software download process flow diagram of FIG. 3.

The present disclosure provides a spectrally efficient means for over-the-air (OTA) downloading of software objects, or content to multiple terminals in wireless communication networks, especially in networks where the population of terminals exceeds the number of unique software objects to be downloaded, for example, when all or several terminals in the network are to receive a software revision or upgrade. The invention is not limited to applications where only a single, common software object is transmitted to multiple users or terminals.

The invention provides more generally for efficient simultaneous, or at least virtually simultaneous, downloading of multiple software objects to a plurality of terminals in wireless communication networks. Some terminals may receive some software content, and other terminals may receive other content. In some embodiments, the dynamics of the software content transmitted by the network and received by the terminals changes dynamically as downloads are completed and new terminals enter into the network, as discussed further below.

Generally, the invention makes use of both shared (common) channels and dedicated (traffic) channels in hybrid over-the-air software downloading schemes. The processes of the present inventions are implemented generally in several phases, otherwise referred to as communication exchanges between the terminals and network. For each phase, the communications between the network and terminals therein are allocated most efficiently to either a common channel or to a dedicated channel, depending upon the nature of the communication or exchange.

The communication phases involving the exchange of terminal unique information are generally assigned to dedicated communication channels. Terminal unique information includes, for example, download initiation information exchanges, capability and non-repudiation information exchanges, activation and billing information exchanges, and other communications that inherently involve the transmission of relative small quantities of data. These small data content exchanges are only exemplary. There could be other information exchanges not listed, and not all of the exemplary exchanges are required. These and other communications are well suited for point-to-point or dedicated channels, since the volume of data exchanged is relatively small and the spectral inefficiency of dedicated channels is insignificant, at least relative to that associated with the transmission of software content having file sizes on the order of 1 Mbyte or more.

Other communications occurring on dedicated channels include those for which optimum error protection is required, for example the transmission of digital signatures and other error sensitive information. In some applications, the desire for providing error protection may outweigh the benefits provided by reduced bandwidth associated with transmission of broadcast information over common channels.

The communication phases involving the transmission, or downloading, of substantial amounts of software objects or content from the network to one and preferably to multiple terminals in the network are assigned to common channels, which continuously stream downloadable content from the network to the terminals. In this way, the spectral requirement for the bandwidth intensive part of the download process is minimized. The data transfer typically involves relatively large quantities of data, e.g., terminal software content, sent primarily in the downlink direction to multiple terminals.

An example of a common channel is the Packet Broadcast Control Channel (PBCCH) of a GPRS network. An example of a dedicated channel is the Packet Data Traffic Channel (PDTCH) of a GPRS network. In the exemplary GPRS network implementation, one or more PBCCHs could be allocated for purposes of broadcast software downloading.

The present disclosure is not limited to applications in GPRS networks, but may be applied instead to any wireless communication standard employing some type of over-the-air (OTA) software download. The initial commercial opportunities for application of the present inventions will likely be in higher tier and smart terminal product markets, but in the not too distant future the transfer of substantial amounts of software content to mobile terminals will be commonplace at many if not most wireless communication network service levels.

In FIG. 1, the downloading of software from the network to a terminal is initiated at block 100 on a dedicated channel. The initiation may be prompted by the network or by the terminal. FIG. 2 generally characterizes the download initiation communications between the terminal 200 and the network 210 as a relatively small bi-directional data flow, which is allocated to a dedicated channel. The preliminary initiation exchanges, at least initially, will likely be transparent to the terminal user, although for some applications it could be user initiated and may require user input or response.

In FIG. 1, at block 120, download capability exchange information is exchanged between the network and the terminal, and in FIG. 2 the information exchange is characterized generally as a relatively small bi-directional data flow, which as noted is also allocated to a dedicated channel.

In FIG. 1, the data content download occurs at block 130. FIG. 2 illustrates this data transfer as a large asymmetrical data transfer from the network 210 to the terminal 200, preferably to multiple terminals, which are not illustrated.

FIG. 1 illustrates, at block 140, a software installation step, which is a local process occurring at the terminal, as illustrated in FIG. 2. Generally, upon receipt of a software download, or after installation thereof by or at the terminal, the terminal transmits a software receipt confirmation notification to the network. This low data content confirmation communication preferably occurs on a dedicated channel.

FIG. 1, at block 150, also illustrates the communication of non-repudiation information. At block 160, activation and billing information, which are both characterized by small bi-directional data flows, are preferably allocated to dedicated communication channels.

Figure 3:
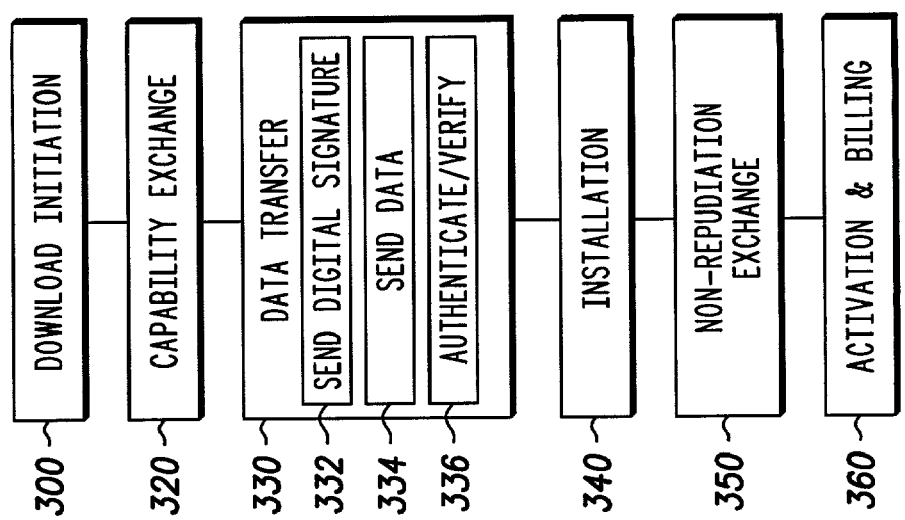
FIG. 3 is a more particular exemplary schematic of a software download process flow diagram.

The process flow diagram of FIG. 3 illustrates some of the same information communicated between the network and terminal as illustrated in FIG. 1. Particularly, in FIG. 3, the download initiation 300 and capability exchange 320, installation 340, and the non-repudiation exchange 350, and activation and billing exchange 360, which are not all essential, though typical in one form or another of a software content download transaction. Other exchanges, not illustrated, may also be included.

FIG. 3 also illustrates, in the data transfer block 330, the communication or transmission of a digital signature 332 generally during the data transfer phase 330 from the network to the plurality of terminals on the dedicated communication channel. FIG. 4 illustrates, with spatial correspondence relative to FIG. 3, whether the various exchanges in FIG. 3 are allocated to dedicated or common channels in the network.

In the well-known Public Key Infrastructure (PKI), a digital signature is produced and transmitted by the sender, which is the network in most embodiments. More particularly, the file or data to be transferred is initially converted to a "message digest" with a Hash function. The "message digest" is subsequently encrypted with the sender's private key, thus producing the digital signature. The PKI encryption application is only exemplary and the invention is not intended to be limited to any particular encryption scheme.

In the present invention, generally, the digital signature may be transmitted to the terminals from the network on either dedicated channels or on a shared channel, since the digital signature is common information. Transmission over a dedicated channel will, by virtue of its bi-directional nature, provide far superior error protection for the digital signature compared to transmission over a common channel. Therefore, in a preferred application, the digital signature 332 is transmitted on a dedicated channel, as illustrated in FIGS. 3 and 4.

The sender's public key can be installed in the terminal, for example, in phone software, in a number of ways. The public key may be programmed in the handset by the manufacturer, for example by installing a ROM chip. An alternative is for the network operator to program the public key into the terminal prior to selling the phone to a subscriber. Yet another alternative is to transmit the public key to the terminal, preferably via a dedicated channel. In this case, the public key could originate from a server controlled by either the equipment manufacturer, or from the network operator, or from a Certificate Authority (CA).

In FIG. 3, upon receipt of the data transmitted during the data transfer 334, the public key, a copy of which resides on the terminal, enables the authentication or verification 336 of the digital signature 332 in a local process occurring at the terminal. The integrity of the data may also be verified.

In some software download applications, the software content transmitted by the network comprises a plurality of different software files multiplexed on a shared communication channel for receipt by multiple terminals, thus providing different software content, which may be downloaded concurrently by different terminals.

In applications where two or more software files are multiplexed on the shared communication channel, the software content may be dynamically adjusted on the shared communication channel, for example to more efficiently accommodate the requirements of the terminals receiving the software.

In one application, the software content multiplexed on the shared communication channel is adjusted dynamically by adjusting a transmission time of each of the plurality of software files. Assume, for example, that the software download process is being managed for 1000 terminals in the network: 600 terminals require software object A; 300 terminals require software object B; and 100 terminals require software object C.

In one embodiment, software object A will be transmitted on the shared channel 60 percent of the time, and software objects B and C will be transmitted 30 percent and 10 percent of the time, respectively. The exemplary temporal proportions can be adjusted dynamically to accommodate changes in the number of terminals requiring the different software objects, for example as active download processes are completed and new downloads are initiated as indicated upon completion of activation and billing exchanges and new initiation exchanges discussed above.

In another embodiment, the software content multiplexed on the shared communication channel is adjusted dynamically by adjusting the number of times each of the plurality of software files is transmitted.

In another embodiment, the software content multiplexed on the shared communication channel is prioritized, for example, by giving higher priority to the transmission of content that generates greater amounts of revenue relative to the transmission of that which generates lesser amounts of revenue.

In another embodiment, the software content multiplexed on the shared communication channel is prioritized by giving higher priority to the transmission of software content that is more essential over that which is less essential, for example, operating system updates may be prioritized over application or optional software updates. The software content multiplexed on the shared communication channel may also be adjusted dynamically based upon file size or content.

Figure 5:
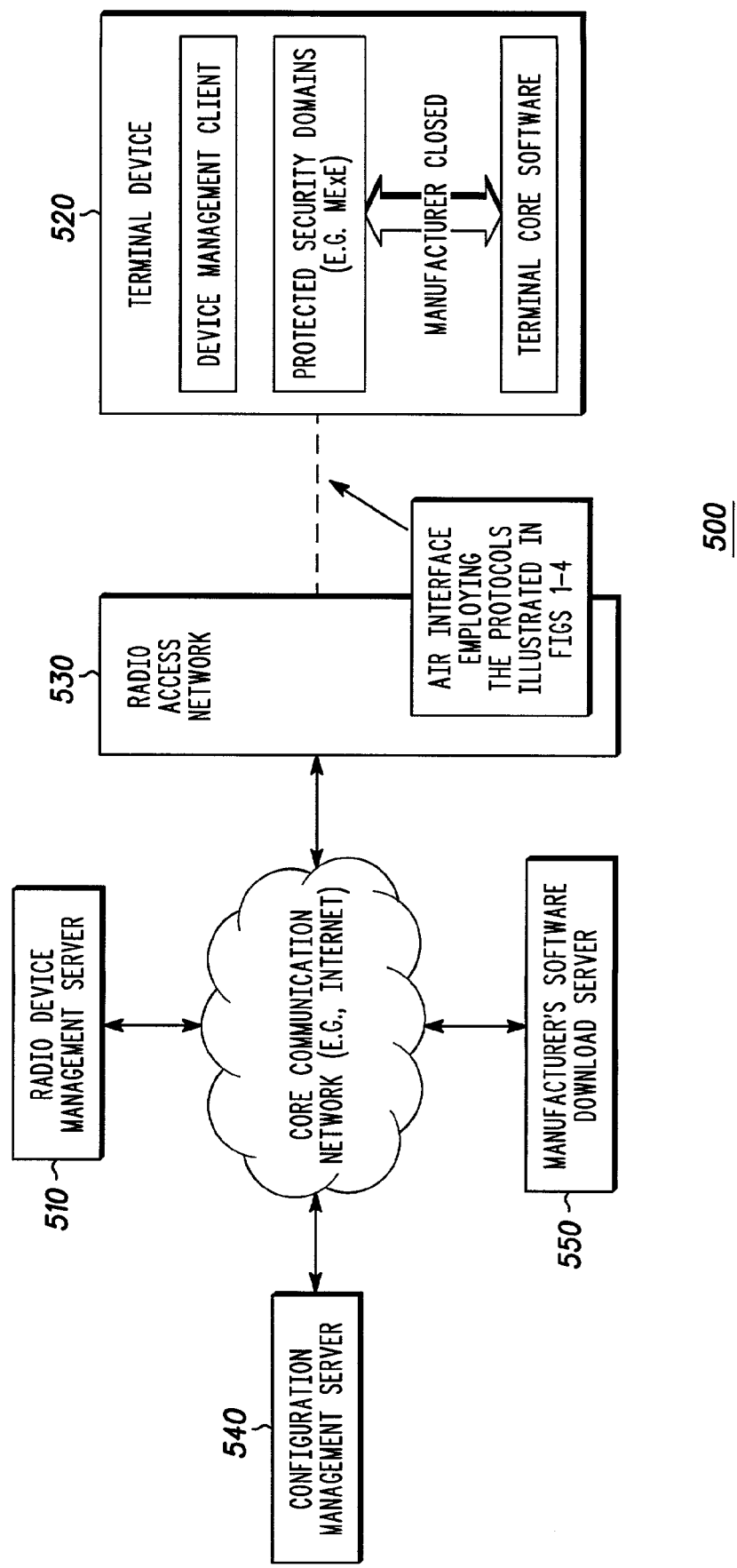
FIG. 5 is an exemplary wireless communication network in which the software download processes may be practiced.

In the exemplary network architecture 500 of FIG. 5, a radio device management server 510 manages the download process for all terminals 520 in the radio access network 530. In some implementations, the server 510 generates a continuous software download stream, which is mapped to the physical shared channel. The Radio Device Management Server may thus dynamically adjust the proportionality and/or priority of multiple software objects multiplexed onto the shared channel. The software download may be managed alternatively by means other than a dedicated management server.

The time multiplexed software download payloads can be fragmented using conventional packet transmissions. Packet protocols generally include headers having software checksums for positive identification of the encapsulated payload, fragment index counters for identifying the current fragment in the overall payload, a next transmission field that informs the terminal when the next fragment will be transmitted, as is known generally by those having ordinary skill in the art.

The exemplary architecture of FIG. 5 includes a configuration management server 540 that contains a database that defines approved and disapproved hardware and software configurations. The configuration management server 540 may be managed for example by an equipment manufacturer, and made accessible by the Radio Device Management Server 510. The database on the configuration server 540 contains, for example, a unique identifier of the software ("type"), the software version indicator (software "revision"), and a cryptographic checksum ("checksum"), which collectively identify the software uniquely and allow verifying that it has been fetched correctly. This information can be presented to the Manufacturer's Software Download Server to fetch a copy of the designated software.

In other embodiments, the exemplary architecture of FIG. 5 also includes a configuration management server 550 containing new software releases, including core software. Content from the server can be electronically signed by the manufacturer, thus allowing the terminal device to process the content according to security protocols running in the terminal device (e.g. MExE). The configuration management server 550 is accessible by the radio device management server 510.

While the present inventions and what is considered presently to be the best modes thereof have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A radio communication network software downloading method, comprising:

sending, from the network, a message to a plurality of terminals on corresponding dedicated communication channels to receive software content on a shared channel;

transmitting the software content from the network to the plurality of terminals on the shared communication channel after sending the message, the software content comprises a plurality of different software content, the plurality of different software content multiplexed on the shared communication channel;

dynamically adjusting the plurality of different software content multiplexed on the shared communication channel by prioritizing software content that generates greater amounts of revenue relative to software content that generates lesser amounts of revenue.

2. The method of claim 1, receiving a request for different software content from the plurality of terminals on corresponding dedicated communication channels, transmitting the software content from the network to the plurality of terminals on the shared communication channel after receiving the request;

receiving confirmation from each of the plurality of terminals that received the software content on corresponding dedicated communication channels for each terminal after transmitting.

3. The method of claim 1, receiving confirmation from each of the plurality of terminals that received the common software content on corresponding dedicated communication channels for each terminal after transmitting.

4. The method of claim 1, transmitting a digital signature from the network to the plurality of terminals over corresponding dedicated communication channels for each terminal;

transmitting the software content from the network to the plurality of terminals on the shared communication channel after transmitting the digital signature.

5. A radio communication network software downloading method, comprising:

transmitting software content from a radio communication network to a plurality of terminals in the network on a shared communication channel received by the plurality of terminals, the software content comprises a plurality of software files multiplexed on the shared communication channel; and prioritizing the transmission of software files that generate greater amounts of revenue relative to the transmission of software files that generate lesser amounts of revenue.

6. The method of claim 5, dynamically adjusting the software content multiplexed on the shared communication channel from a radio device management server in communication with the radio communication network.

7. The method of claim 5, the software content comprises a plurality of different software files, dynamically adjusting the software content multiplexed on the shared communication channel by adjusting a transmission time of each of the plurality of software files.

8. The method of claim 5, receiving confirmation from each of the plurality of terminals that received the software content on corresponding dedicated communication channels for each terminal after transmitting.

9. The method of claim 5, fragmenting the software content multiplexed on the shared channel by packetizing the software content.

* * * * *